United States Patent
King

(10) Patent No.: US 10,411,488 B2
(45) Date of Patent: Sep. 10, 2019

(54) ONBOARD BATTERY CHARGING SYSTEM

(71) Applicant: Club Car, LLC, Evans, GA (US)

(72) Inventor: Russell William King, Evans, GA (US)

(73) Assignee: Club Car, LLC, Evans, GA (US)

(*) Notice: Subject to any disclaimer, the term of this patent is extended or adjusted under 35 U.S.C. 154(b) by 288 days.

(21) Appl. No.: 15/144,078

(22) Filed: May 2, 2016

(65) Prior Publication Data
US 2017/0317513 A1 Nov. 2, 2017

(51) Int. Cl.
H02J 7/00 (2006.01)
B60L 11/18 (2006.01)
(Continued)

(52) U.S. Cl.
CPC ............ H02J 7/0055 (2013.01); B60L 3/00 (2013.01); B60L 3/0092 (2013.01); B60L 3/04 (2013.01); B60L 53/16 (2019.02); B60L 53/18 (2019.02); B60L 53/305 (2019.02); B60L 53/60 (2019.02); H02J 7/0081 (2013.01); Y02T 10/7005 (2013.01); Y02T 10/7088 (2013.01);
(Continued)

(58) Field of Classification Search
CPC .......... H02J 7/0055; H02J 7/0081; H02J 7/00; B60L 11/18; B60L 11/1818; B60L 11/1838; B60L 3/00; B60L 3/0092; B60L 3/04; B60L 2230/12; B60L 2230/16
USPC ........................................................ 320/109
See application file for complete search history.

(56) References Cited

U.S. PATENT DOCUMENTS 5,610,532 A * 3/1997 Smith ................. H02H 1/0007
324/127
7,778,746 B2 8/2010 McLeod et al.
(Continued)

FOREIGN PATENT DOCUMENTS

EP 2447106 A1 5/2012
WO 2013181482 A1 12/2013
(Continued)

OTHER PUBLICATIONS

SAE EV Charging Systems Committee, SAE Electric Vehicle Conductive Charge Coupler, Aug. 2001, 30 pgs.
(Continued)

Primary Examiner — Richard Isla
Assistant Examiner — Dung V Bui
(74) Attorney, Agent, or Firm — Taft Stettinius & Hollister LLP

(57) ABSTRACT

Unique systems, methods, techniques and apparatuses of onboard battery charger systems are disclosed. One exemplary embodiment is a battery charging system comprising an isolation device and an electric vehicle charger. The isolation device includes an AC input terminal; an AC output terminal; two DC output terminals; a first portion of a detection circuit including a first sensor and a first resistor coupled in series; and a first controller. The charger includes an AC input terminal; two DC input terminals; and a second portion of the detection circuit including a second sensor and a second resistor coupled in series. The first controller is structured to isolate the AC input terminal of the isolation device from the AC output terminal of the isolation device when the two DC input terminals of the electric vehicle charger are not coupled to the two DC output terminals of the isolation device.

20 Claims, 4 Drawing Sheets

(51) Int. Cl.
*B60L 3/00* (2019.01)
*B60L 3/04* (2006.01)
*B60L 53/16* (2019.01)
*B60L 53/60* (2019.01)
*B60L 53/18* (2019.01)
*B60L 53/30* (2019.01)

(52) U.S. Cl.
CPC ............ *Y02T 90/121* (2013.01); *Y02T 90/128* (2013.01); *Y02T 90/14* (2013.01); *Y02T 90/163* (2013.01)

(56) References Cited

U.S. PATENT DOCUMENTS

| | | | |
|---|---|---|---|
| 8,346,423 B2 | 1/2013 | Crombez | |
| 8,509,976 B2 | 8/2013 | Kempton | |
| 8,519,562 B2 | 8/2013 | Gibbs et al. | |
| 8,633,678 B2 | 1/2014 | Yegin et al. | |
| 8,884,627 B2* | 11/2014 | Minamii | H02H 7/1225 307/18 |
| 2004/0130288 A1* | 7/2004 | Souther | B60L 11/1851 320/104 |
| 2011/0172839 A1* | 7/2011 | Brown | B60L 3/0069 700/292 |
| 2012/0007553 A1 | 1/2012 | Ichikawa et al. | |
| 2012/0055726 A1* | 3/2012 | Hannon | H04K 3/415 180/272 |
| 2012/0161797 A1* | 6/2012 | Hein | G01R 31/42 324/705 |
| 2012/0286729 A1* | 11/2012 | Yegin | B60L 3/0069 320/109 |
| 2012/0306444 A1 | 12/2012 | Pham et al. | |
| 2013/0119931 A1 | 5/2013 | Klesyk | |
| 2013/0134936 A1 | 5/2013 | Kaneyasu et al. | |
| 2013/0181671 A1 | 7/2013 | King | |
| 2013/0187600 A1* | 7/2013 | Gale | H02J 5/00 320/109 |
| 2013/0271075 A1* | 10/2013 | Restrepo | H02J 7/0042 320/109 |
| 2013/0300429 A1* | 11/2013 | Jefferies | B60L 3/0069 324/511 |
| 2013/0320920 A1 | 12/2013 | Jefferies et al. | |
| 2013/0339757 A1* | 12/2013 | Reddy | G06F 1/3212 713/300 |
| 2014/0111185 A1* | 4/2014 | Cordero-Orille | H02J 7/022 324/76.77 |
| 2014/0197843 A1* | 7/2014 | Schurman | G01R 31/025 324/509 |
| 2014/0232355 A1 | 8/2014 | Masuda et al. | |
| 2014/0375295 A1* | 12/2014 | Ito | H02M 3/158 323/300 |
| 2015/0048782 A1* | 2/2015 | Back | H02J 7/0042 320/107 |
| 2015/0129109 A1* | 5/2015 | Reavis | E04H 4/14 156/71 |
| 2015/0251551 A1* | 9/2015 | Mueller | B60L 11/1818 320/109 |
| 2015/0303737 A1* | 10/2015 | Steinbuchel, IV | B60L 3/0069 320/109 |
| 2016/0107530 A1* | 4/2016 | Roberts | B60L 11/1818 320/109 |

FOREIGN PATENT DOCUMENTS

| | | |
|---|---|---|
| WO | 2013181482 A4 | 12/2013 |
| WO | 2014036013 A2 | 3/2014 |
| WO | 2014036013 A3 | 3/2014 |

OTHER PUBLICATIONS

European Patent Office, Extended European Search Report for corresponding application EP 17168862.5, dated Feb. 7, 2018, 19 pages.

"I need the charging cable wiring diagram, I bought one without the wall connector," PriusChat, Sep. 2013, available at URL: https://priuschat.corn/threads/i-need-the-charging-cable-wiring-diagram-i-bought-one-without-the-wall-connector.131728/, last accessed Feb. 2, 2018.

EV Charging Systems Commitee, "(R) SAE Electric Vehicle Conductive Charge Coupler", vol. J1772, no. Nov. 2001, Nov. 2001, 32 pages, available at URL: http://bzwxw.com/soft/UploadSoft/new5/SAE--J1772-2001.pdf, last accessed Jan. 2, 2012.

* cited by examiner

ONBOARD BATTERY CHARGING SYSTEM

BACKGROUND

The present disclosure relates generally to battery charging systems for electric vehicles. A battery housed in a small electric vehicle, such as a golf cart, is charged using a battery charger and an external power source. The battery charger is either located outside the vehicle and connected to the vehicle by a DC power cord or the battery charger is incorporated into the vehicle and connected to an external power source by way of a cord on a reel. Existing battery charging systems suffer from a number of shortcomings and disadvantages. There remain unmet needs including reducing charging system operation complexity, reducing risk of user injury, reducing costs, increasing charging flexibility, and improving reliability. For example, a vehicle with an onboard charger and a power cord reel cannot differentiate between an unplugged cord and a cord plugged into a power source experiencing a power failure. In another example, a user could be injured while attempting to operate the vehicle while the battery charger is connected to the electric vehicle during a power supply failure. There is a significant need for the unique apparatuses, methods, systems and techniques disclosed herein.

SUMMARY

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

Exemplary embodiments include unique systems, methods, techniques and apparatuses for battery charging systems. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
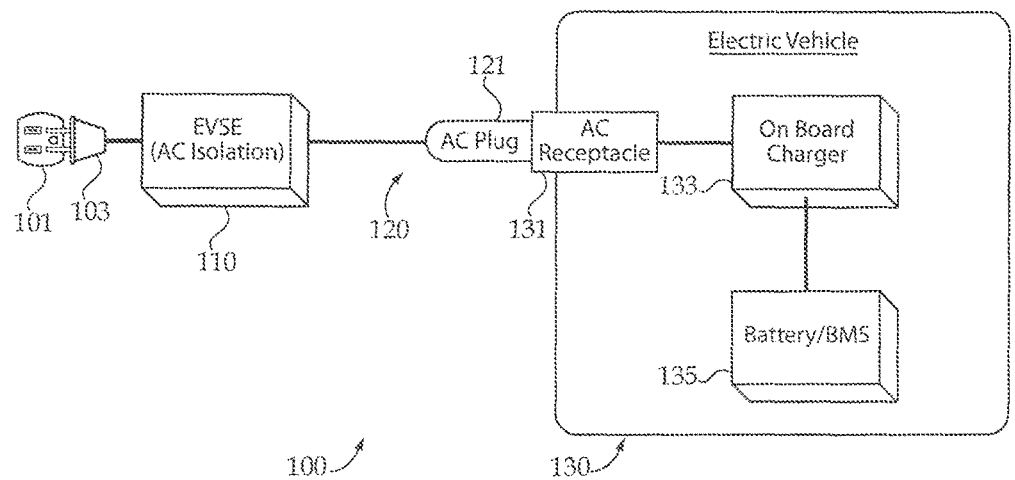
FIG. 1 is a schematic block diagram illustrating an exemplary battery charging system.

With reference to FIG. 1 there is illustrated an exemplary battery charging system 100. It shall be appreciated that system 100 may be implemented in a variety of applications, including golf carts, utility task vehicles, recreational vehicles, and all-terrain vehicles to name but a few examples. System 100 is structured to safely charge a battery located on a small electric vehicle including an onboard battery charger connected to a power supply by a cord that is electrically dead until it is plugged into the onboard battery charger.

System 100 includes isolation device 110, also known as electric vehicle supply equipment (EVSE), coupled to a power source 101 by way of a power cord 103. In the illustrated embodiment, the power source 101 is a wall outlet coupled to a utility grid, the wall outlet having three terminals: a terminal structured to provide a hot connection, a terminal structured to provide a neutral connection, and a terminal structured to provide a ground connection. In another embodiment, isolation device 110 is directly coupled to power source 101. Power source 101 is structured to provide alternating current (AC) power to device 110. Power source 101 may be a utility grid or a gas generator, to name but a few examples.

In the illustrated embodiment, a cable 120 having a plug 121 with output terminals is affixed to device 110. The plug may 121 be any type of connection point having male or female terminals. In other embodiments, device 110 includes output terminals structured to be coupled to a removable cable 120 having a first plug structured to be coupled to isolation device 110 and a second plug 121. The first plug may be structured to break away from isolation device 110 in the event an excessive force is applied to system 100. For example, the first plug may disconnect from isolation device 110 if a user moves the electric vehicle 130 away from the isolation device without first disconnecting plug 121 from electric vehicle 130.

Device 110 is structured to receive power from power source 101 and selectively provide the received power to an electric vehicle 130 by way of cable 120. For example, device 110 will provide power to cable 120 only if device 110 detects electric vehicle 130 is coupled to cable 120. In another example, device 110 will not provide power to cable 120 if device 110 detects an electrical fault in either device 110, cable 120, or electric vehicle 130.

Electric vehicle 130 is structured to receive power from isolation device 110 by way of a plug receptacle 131 located on vehicle 130 and structured to be coupled to plug 121. In one embodiment, vehicle 130 is a golf cart. Vehicle 130 further includes an onboard charger 133 incorporated into electric vehicle 130 and coupled to receptacle 131. Charger 133 is structured to receive AC power from receptacle 131, convert the AC power to direct current (DC) power, and provide the DC power to a battery 135 located within electric vehicle 130, the battery being coupled to charger 133. In certain embodiments, battery 135 includes a battery management system. Charger 133 may be structured as an active rectifier, a passive rectifier, or a combined AC/DC and DC/DC converter. Battery 135 is structured to receive DC power from charger 133 and provide power to an onboard electrical system of vehicle 130, such as an electric motor structured to move electric vehicle 130, a lighting system, or an electronic control system. It shall be appreciated that any or all of the foregoing features of system 100 may also be present in the other battery charger systems disclosed herein.

Figure 2:
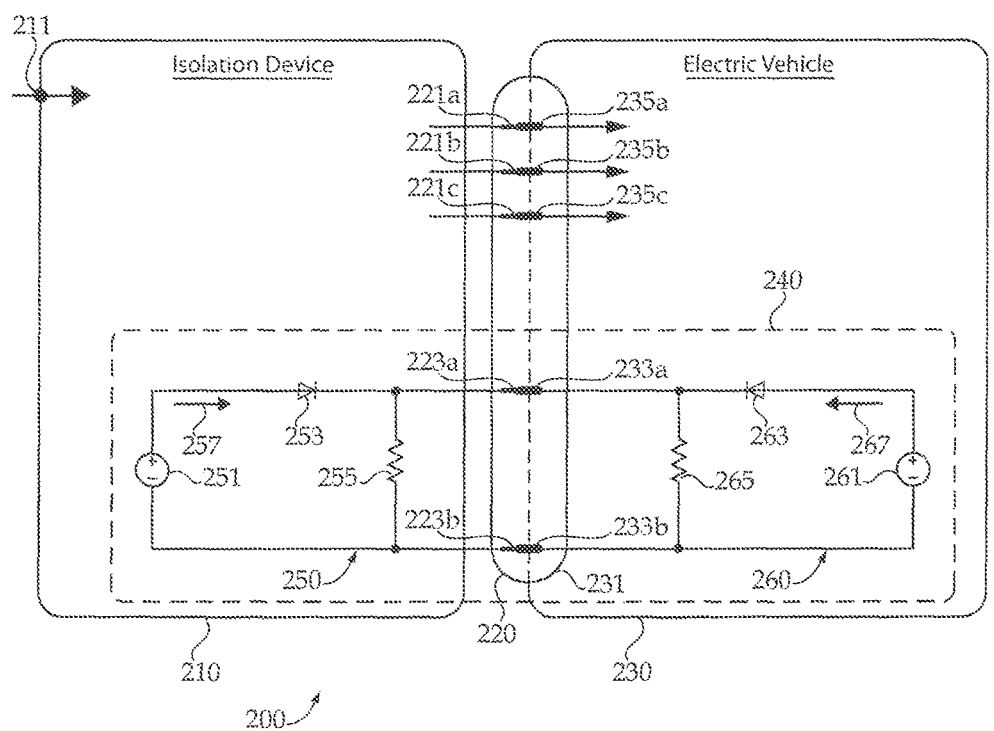
FIG. 2 is a schematic block diagram illustrating an exemplary battery charging system with an equivalent detection circuit.

With reference to FIG. 2 there is illustrated an exemplary battery charger system 200 including an isolation device 210 and an electric vehicle 230. Isolation device 210 includes an input terminal 211 coupled to an AC power supply, the input terminal 211 being structured to receive AC power from the power supply. Device 210 is coupled to a plug 220 having a plurality of AC output terminals 221a, 221b, and 221c structured to provide the AC power received by input terminal 211.

Isolation device 210 also includes a first portion 250 of a detection circuit 240 which includes a DC power source 251, a diode 253, and a resistor 255 coupled together in series. In one embodiment, power source 251 includes a rectifier structured to receive AC power from input terminal 211, convert the AC power to DC power, and provide DC power to detection circuit 240. Diode 253 is structured to allow a current 257 to flow in one direction from power source 251 to resistor 255. Plug 220 includes a plurality of DC output terminals 223a and 223b. Resistor 255 is coupled in parallel with DC output terminals 223a and 223b.

Electric vehicle 230 includes a plug receptacle 231 structured to be coupled to AC output terminals 221a-221c and DC output terminals 223a and 223b of plug 220. Specifically, receptacle 231 includes AC input terminals 235a, 235b, and 235c structured to be coupled to isolation device AC output terminals 221a, 221b, and 221c, respectively, as well as DC input terminals 233a and 233b structured to be coupled to DC output terminals 223a and 223b, respectively. The AC input terminals 235a-235c are coupled to a battery by way of a battery charger and are structured to provide power to the battery.

Electric vehicle 230 includes a second portion 260 of the detection circuit 240 which includes a DC power source 261, a diode 263, and a resistor 265 coupled together in series. Diode 263 is structured to allow a current 267 to flow in one direction from DC power source 261 to resistor 265. DC input terminals 233a and 233b are coupled in parallel with resistor 265. In the illustrated circuit 240, resistors 255 and 265 are structured as the same size. In other embodiments, resistors 255 and 265 may be of varying sizes so long as the size of each affects a change in the magnitudes of currents 257 and 267 as described below.

In the illustrated circuit 240, DC power source 261 is structured such that the voltage across the DC power source 261 is half the voltage across DC power source 251. In certain embodiments, DC power source 261 is structured such that the voltage across the DC power source 261 is less than the voltage across DC power source 251. In certain embodiments, DC power source 261 is structured such that the voltage across the DC power source 261 is greater than the voltage across DC power source 251.

The magnitudes of current 257 and current 267 indicate various conditions of system 200. The detection circuit 240 is structured such that current 257 is a first magnitude when the isolation device 210 is receiving AC power from the AC power supply but device 210 is not coupled to the electric vehicle 230. The detection circuit 240 is also structured such that current 257 is a second magnitude, which is greater than the first current magnitude, when the isolation device 210 is receiving AC power from the power supply and device 210 is coupled to the electric vehicle 230. It is important to note current 257 is still the second magnitude even if the voltage across DC power source 261 is zero, such as when electric vehicle 230 is powered down.

The detection circuit 240 is structured such that current 267 is a first magnitude when the isolation device 210 is not coupled to the electric vehicle 230. The detection circuit 240 is also structured such that current 267 is a second magnitude, which is greater than the first magnitude of current 267, when the isolation device is not receiving AC power but the isolation 210 device is coupled to the electric vehicle 230. The detection circuit 240 is structured such that the current 267 has a magnitude of zero when the isolation device 210 is receiving AC power and the isolation device is coupled to the electric vehicle. It shall be appreciated that the relationship of the current magnitudes would be different in other embodiments where the relationship of voltages across DC power source 251 and 261 has been changed. It shall be appreciated that any or all of the foregoing features of system 200 may also be present in the other battery charger systems disclosed herein.

Figure 3:
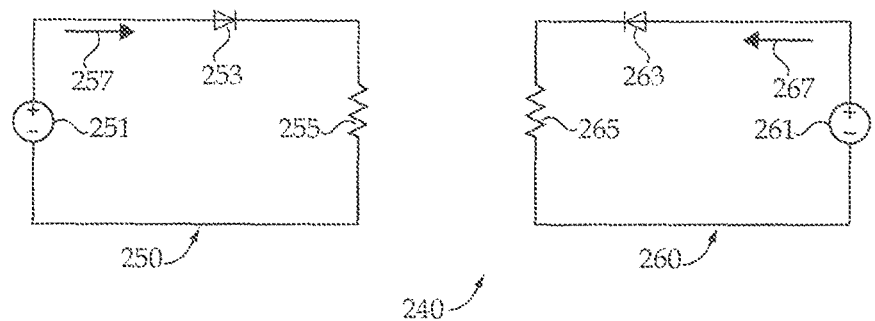
FIGS. 3-5 are equivalent circuits illustrating possible states of the detection circuit in FIG. 2.

With reference to FIG. 3, there is illustrated detection circuit 240 of FIG. 2 in which the isolation device 210 is not coupled to electric vehicle 230. Circuit 240 includes a first portion 250 of detection circuit 240 which is incorporated into isolation device 210, the first portion including power source 251, diode 253, and resistor 255 coupled in series. Circuit 240 is structured such that current 257 flows through diode 253 from power source 251 to resistor 255. Circuit 240 also includes a second portion 260 of detection circuit 240 which is incorporated into electric vehicle 230, the second portion including power source 261, diode 263, and resistor 265 coupled in series. Circuit 240 is structured such that current 267 flows from power source 261 to resistor 365. It is important to note resistors 253 and 255 are not coupled in parallel, as in FIG. 2. It shall be appreciated that any or all of the foregoing features of detection circuit 240 illustrated in FIG. 3 may also be present in the other detection circuits disclosed herein.

Figure 4:
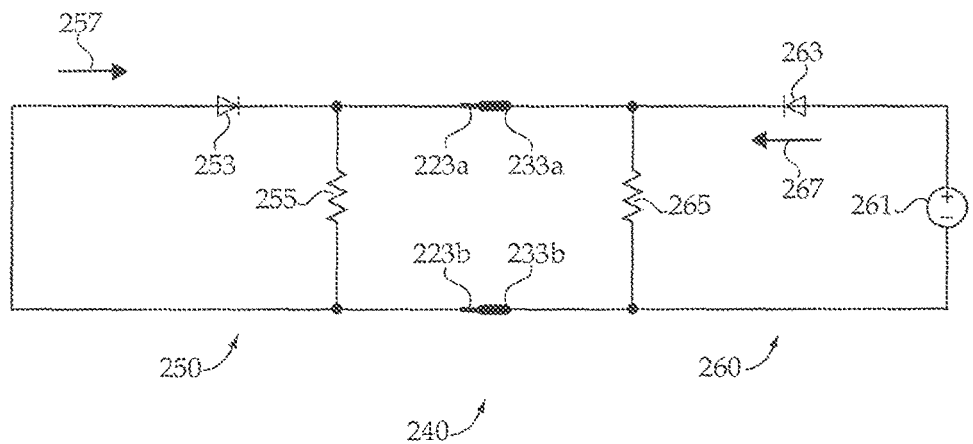

With reference to FIG. 4, there is illustrated detection circuit 240 of FIG. 2 in which isolation device 210 is not receiving power due to an internal fault or an AC power source failure. Circuit 240 includes a first portion 250 of detection circuit 240 which is incorporated into isolation device 210, the first portion including diode 253 and resistor 255 coupled in series. Circuit 240 is structured such that the absence of power from power source 251 creates a short circuit current 257 flowing through diode 253 to resistor 255. In other embodiments, the absence of power source 251 creates an open circuit in which the magnitude of current 257 is zero.

Circuit 240 also includes a second portion of detection circuit 260 which is incorporated into electric vehicle 230, the second portion including power source 261, diode 263, and resistor 265 coupled in series. Resistors 255 and 265 are coupled in parallel by way of isolation device DC output terminals 223a and 223b, as well as electric vehicle 230 DC input terminals 233a and 233b.

In the illustrated detection circuit 240, the isolation device 210 and electric vehicle are coupled together. Circuit 240 is structured such that current 267 flows from power source 261 to diode 263. It is important to note power source 251 of detection circuit 240 is missing, indicating a fault in the isolation device 210 or an AC power source failure. Because power source 251 is missing, current 257 has a zero magnitude. For reasons known to those skilled in the art, current 267 in FIG. 4 is larger than current 267 in FIG. 3 due to the presence of resistor 255 coupled in parallel with resistor 265. It shall be appreciated that any or all of the foregoing features of detection circuit 240 illustrated in FIG. 4 may also be present in the other detection circuits disclosed herein.

Figure 5:
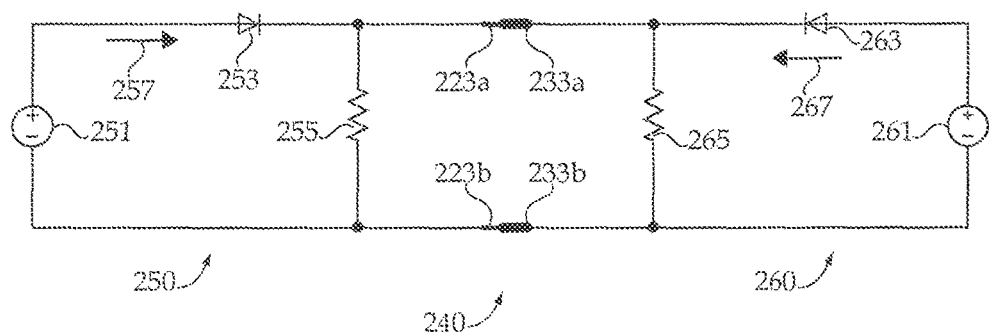

With reference to FIG. 5, there is illustrated detection circuit 240 of FIG. 2 in which isolation device 210 is receiving AC power and electric vehicle 230 is coupled to isolation device 210. Circuit 240 includes a first portion 250 of detection circuit 240 which is incorporated into isolation device 210, the first portion including power source 251, diode 253, and resistor 255 coupled in series. Circuit 240 is structured such that current 257 flows through diode 253 from power source 251 to resistor 255. Circuit 240 also includes a second portion of detection circuit 260 which is incorporated into electric vehicle 230, the second portion including power source 261, diode 263, and resistor 265 coupled in series. Circuit 240 is structured such that current 267 flows from power source 261 to diode 263. Resistors 255 and 265 are coupled in parallel by way of isolation device DC output terminals 223a and 223b, as well as electric vehicle 230 DC input terminals 233a and 233b, indicating the isolation device 210 and electric vehicle 230 are coupled. It is important to note there is no current flowing from power source 261 to diode 263; therefore the magnitude of current 267 is zero. Current 257 will have the same magnitude regardless of whether power source 261 is coupled or not coupled to circuit 250.

In the illustrated embodiment, the voltage across power source 251 is larger than the voltage across power source 261; therefore, current 257 from power source 251 exceeds current 267 from power source 261. Since diode 263 is structured to block all current flowing to from power source 251 to power source 261, there is no current flowing through diode 263. It shall be appreciated that any or all of the foregoing features of detection circuit 240 illustrated in FIG. 5 may also be present in the other detection circuits disclosed herein.

Figure 6:
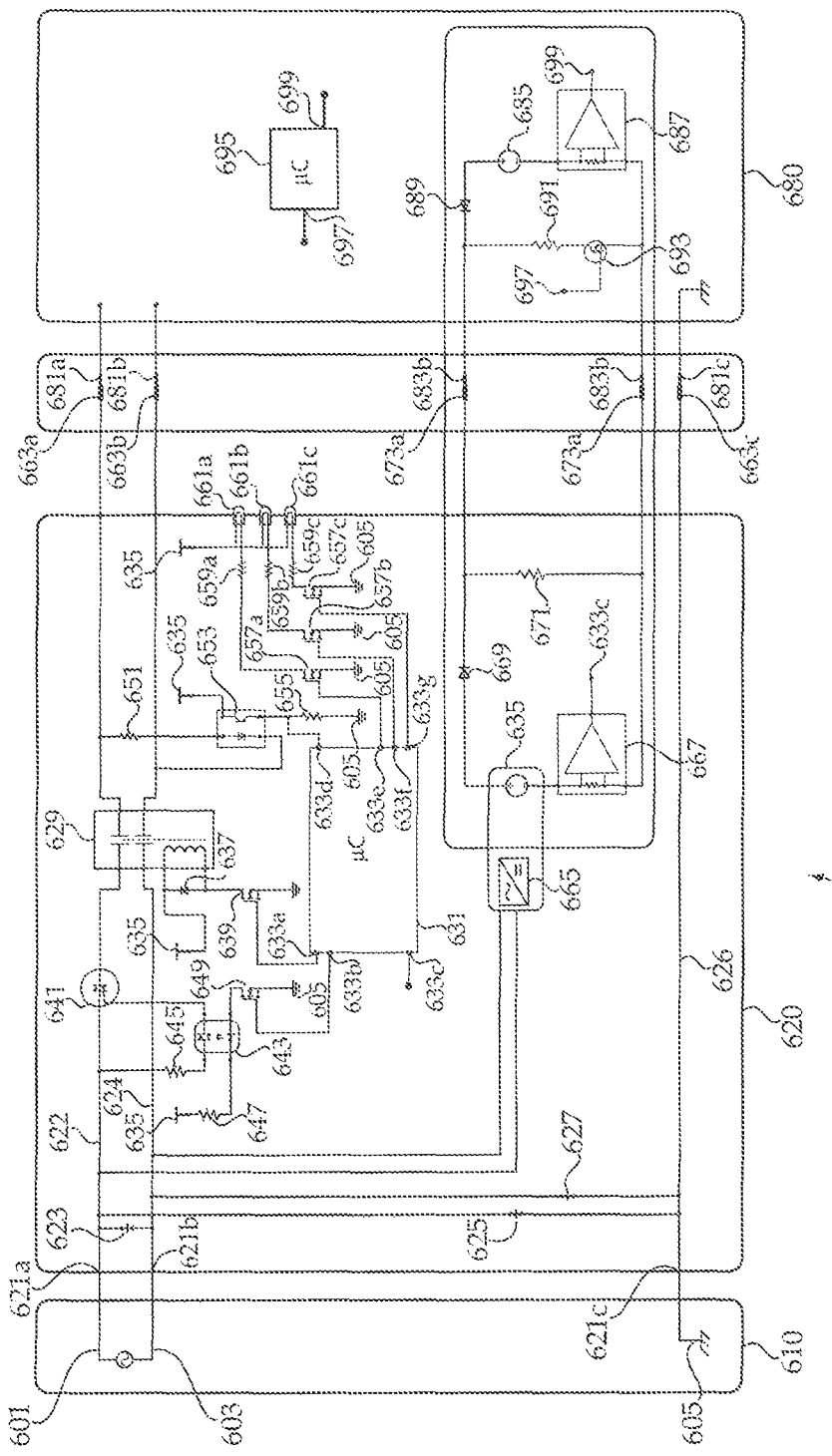
FIGS. 6-7 are circuit diagrams illustrating exemplary battery charging systems.

With reference to FIG. 6 there is a circuit diagram illustrating an exemplary battery charger system 600 including an isolation device 620, and an electric vehicle 680. A power source 610 is structured to provide AC power and includes a hot terminal 601, a neutral terminal 603, and a ground terminal 605. Isolation device 620 is coupled to power source 610 and is structured to receive AC power from source 610. Specifically, isolation device 620 includes an input terminal 621a coupled to hot terminal 601, an input terminal 621b coupled to a neutral terminal 603, and an input terminal 621c coupled to ground terminal 605. Distribution lines 622, 624, and 626 are coupled to input terminals 621a, 621b, and 621c, respectively.

Device 620 includes a transient voltage suppression diode 623 coupled between lines 622 and 624, diode 623 being structured to reduce voltage transients by clamping voltages at fixed levels in response to detecting deviations in voltage. It shall be appreciated that the foregoing features of diode 623 may be present in the other transient voltage suppression diodes disclosed herein. Device 620 also includes a transient voltage suppression diode 625 coupled between lines 622 and 626, and a transient voltage suppression diode 627 coupled between lines 624 and 626.

Device 620 further includes a microcontroller 631 having a plurality of pins 633c and 633d structured to receive signals and a plurality of pins 633a, 633b, and 633e-633g structured to output signals. Device 620 further includes DC power source 635 structured to receive AC power from lines 622 and 624 and convert the received AC power to DC power. In certain embodiments, power source 635 is a plurality of power sources.

DC power source 635 is coupled to ground 605 by way of a resistor 647, an optocoupler 643, and a switching device 643 coupled together in series. Switching device 649 is coupled to pin 633b of microcontroller 631 and is structured to receive an activation signal from pin 633b so as to open and close switching device 649. In the illustrated embodiment, switching device 649 is a metal-oxide semiconductor field effect transistor (MOSFET). In other embodiments, switching device 649 is an IGBT, relay or any other type of switching device structured to allow and interrupt the flow of current. It shall be appreciated that the foregoing features of switching device 649 may be present in the switching devices disclosed herein. Optocoupler 643 is also coupled to in parallel to line 622 by way of a resistor 645 and a triode for alternating current (triac) 641. Resistor 645 is structured to limit the flow of current. It shall be appreciated that the foregoing features of resistor 645 may be present in the other resistors disclosed herein. Triac 641 is structured to allow current to flow through line 622 in response to receiving a current at the activation gate. In response to microcontroller 631 closing switching device 649, a current flowing from power source 635 flows through the LED of optocoupler 643 causing the switching device of the optocoupler to close, which in turn allows current to flow from line 622 to the activation gate of triac 641 by way of the optocoupler 643 and resistor 645. Microcontroller 631 is structured to disrupt the flow of current on line 622 by not providing an activation signal to switching device 649.

Device 620 further includes a double pole, single throw relay 629 coupled to lines 622 and 624, the relay being structured to allow and interrupt the flow of current on lines 622 and 624. Power source 635 is coupled to ground 605 by way of the winding of relay 629 and a switching device 639. Microcontroller 631 is coupled to switching device 639 by way of pin 633a. A diode 637 is coupled in parallel with the winding of relay 629. In one embodiment, microcontroller 631 is structured to close relay 629 by providing power to the winding of relay 629 by way of pin 633a and also structured to open relay 629 by not providing power to the winding of relay 629. If microcontroller 631 attempts to stop the flow of current in lines 622 and 624 by opening relay 629 without success, microcontroller 631 is structured to detect the fault and terminate the activation signal to pin 633b so as to open triac 641. If microcontroller 631 attempts to stop the flow of current in lines 622 and 624 by opening triac 641 without success, microcontroller 631 is structured to detect the fault and open relay 629.

Power source 635 is also coupled to ground 605 by way of an optocoupler 653 and a resistor 655. Optocoupler 653 is also coupled to lines 622 and 624 by way of a resistor 651. Pin 633d is coupled to optocoupler 653. When current from line 622 illuminates the LED of optocoupler 653, the switching device of optocoupler 653 allows current to flow from power source 635 to ground, generating an input signal at pin 633d. Isolation device 620 includes AC output terminals 663a, 663b, and 663c coupled to lines 622, 624, and 626, respectively. An input signal at pin 633d indicates the presence of current on line 622 between relay 629 and the output terminals 663a and 663b.

Microcontroller 631 is structured to selectively illuminate a plurality of indicator LEDs 661a-661c. Each indicator LED 661a-661c is coupled to ground by way of a resistor 659a-659c, respectively, and a switching device 657a-657c, respectively. Pin 633e is coupled to switching device 657a; pin 633f is coupled to switching device 657b, pin 633g is coupled to switching device 657c. In the illustrated embodiment, one of the indicator LEDs indicates the presence of AC power at input terminals 621a-621c, one of the indicator LEDs indicates the presence of AC power flowing between relay 629 and output terminals 663a and 663b, and one of the indicator LEDs indicates the presence of a fault.

Isolation device 620 includes a portion of a detection circuit structured to detect the presence of a coupled electric vehicle 680. The detection circuit includes the power source 635, a current sensor 667, a diode 669, and a resistor 671 coupled in series. Diode 669 is structured to block current flowing to power source 635. The current sensor 667 is coupled to pin 633c of microcontroller 631; structured to measure the current flowing from power source 635 to diode 669; and structured to transmit the current measurement to pin 633c. For example, when isolation device 620 is not coupled to electric vehicle 680, current sensor 667 will measure a first current value which is transmitted to pin 633c. In response, microcontroller 631 is structured to respond to the received current value by illuminating indicator LED 661a, indicating the presence of AC power at input terminals 621a-621c. Microcontroller 631 is also structured to terminate the signal, if the signal was being transmitted, to 657b so as to inactivate the indicator LED 661b indicating that electric vehicle 680 is coupled to isolation device 620. Microcontroller 631 is further structured to open or keep open relay 629 in order to electrically isolate AC output terminals 663a-663c.

Microcontroller 631 is structured to operate relay 629 in response to receiving current measurements from current sensor 667. The magnitude of the current measurement received by microcontroller 631 determines the action to be taken by microcontroller 631. In one embodiment, microcontroller 631 may compare the current measurement received from current sensor 667 to a plurality of defined current magnitude ranges. Microcontroller 631 is structured to perform a certain action if the received current measurement falls within a defined range of current magnitudes. For example, microcontroller 631 receives a current measurement from the sensor 667, compares the current measurement to a first range of current magnitudes indicating the isolation device 620 is coupled to electric vehicle 680, and allows AC power to flow from AC input terminals 621a-621b to AC output terminals 663a-663b, respectively, in response to the received current measurement being within the first range of current magnitudes. In another example, microcontroller 631 is structured to isolate AC input terminals 621a-621b from AC output terminals 663a-663b in response to the received current measurement being within a second range of current magnitudes. If microcontroller 631 receives a current measurement which does not fall within a defined current magnitude, a fault is detected and microcontroller 631 is structured to illuminate the fault LED indicator and open relay 629.

Isolation device 620 also includes DC output terminals 673a and 673b coupled in parallel with resistor 671. Isolation device 620 is structured to be coupled to electric vehicle 680. Specifically, AC output terminals 663a-663c are coupled to electric vehicle AC input terminals 681a-681c, respectively, and DC output terminals 673a and 673b are coupled to electric vehicle DC input terminals 683a and 683b, respectively.

Electric vehicle 680 includes the second portion of the detection circuit, which includes a DC power source 685, a current sensor 687, a diode 689, and a resistor 691 coupled in series. Current sensor 687 is structured to measure the current flowing from power source 685 to diode 689 and transmit the current measurement. DC input terminals 683a and 683b are coupled to resistor 691 in parallel. A switching device 693 is coupled in parallel with the DC input terminals 683a and 683b and coupled in series with resistor 691.

Electric vehicle 680 includes a controller 695 coupled to switching device 693 by way of a line 697 and current sensor 687 by way of line 699. In certain embodiments, controller 695 is a microcontroller. In certain embodiments, controller 695 is structured to disable operational controls of the electric vehicle 680 when the electric vehicle is coupled to the isolation device 620, such as the ability to drive the vehicle. Controller 695 is structured receive a current measurement from current sensor 687 by way of line 699. For example, current sensor 687 may transmit a first current measurement to controller 695 when electric vehicle 680 is not coupled to isolation device 620. In response, controller 695 is structured to power down certain electrical systems of the electric vehicle 680. The powered down electrical systems may include lighting systems, electric drive systems, or the battery charger. In another example, current sensor 687 may transmit a zero current value to controller 695, indicating isolation device 620 is coupled to electric vehicle 680 and device 620 is receiving power from AC power source 610.

In still another example, current sensor 687 may transmit a second current value to controller 695 greater than the first current value, indicating the isolation device 620 is coupled to electric vehicle 680, but isolation device 620 is not receiving power from AC power source 610. In response to receiving the second current value, controller 695 is structured to power down certain electrical systems of the electric vehicle 680. When AC power source 610 is restored, controller 631 is structured to close relay 629 so as to wake up the electric vehicle 680.

In response to certain current measurements, controller 605 is structured to terminate the activation signal transmitted to switching device 693 by way of line 697, causing switching device 693 to open, thereby reducing the current sensed by current sensor 667 of the isolation device, which in turn causes microcontroller 631 to open relay 629. For example, if controller 695 receives a current measurement indicating the isolation circuit 620 is coupled to the electric vehicle 680, but the AC input terminals 681a and 681b are not receiving AC power, controller 695 detects a fault and responds by terminating the activation signal transmitted to switching device 693.

In certain embodiments, controller 695 and microcontroller 631 include non-volatile memory structured to store data related to detected faults. In certain embodiments, controller 695 is structured to broadcast a fault over the CAN bus of electric vehicle 680. It shall be appreciated that any or all of the foregoing features of system 600 may also be present in the other battery charger systems disclosed herein.

Figure 7:
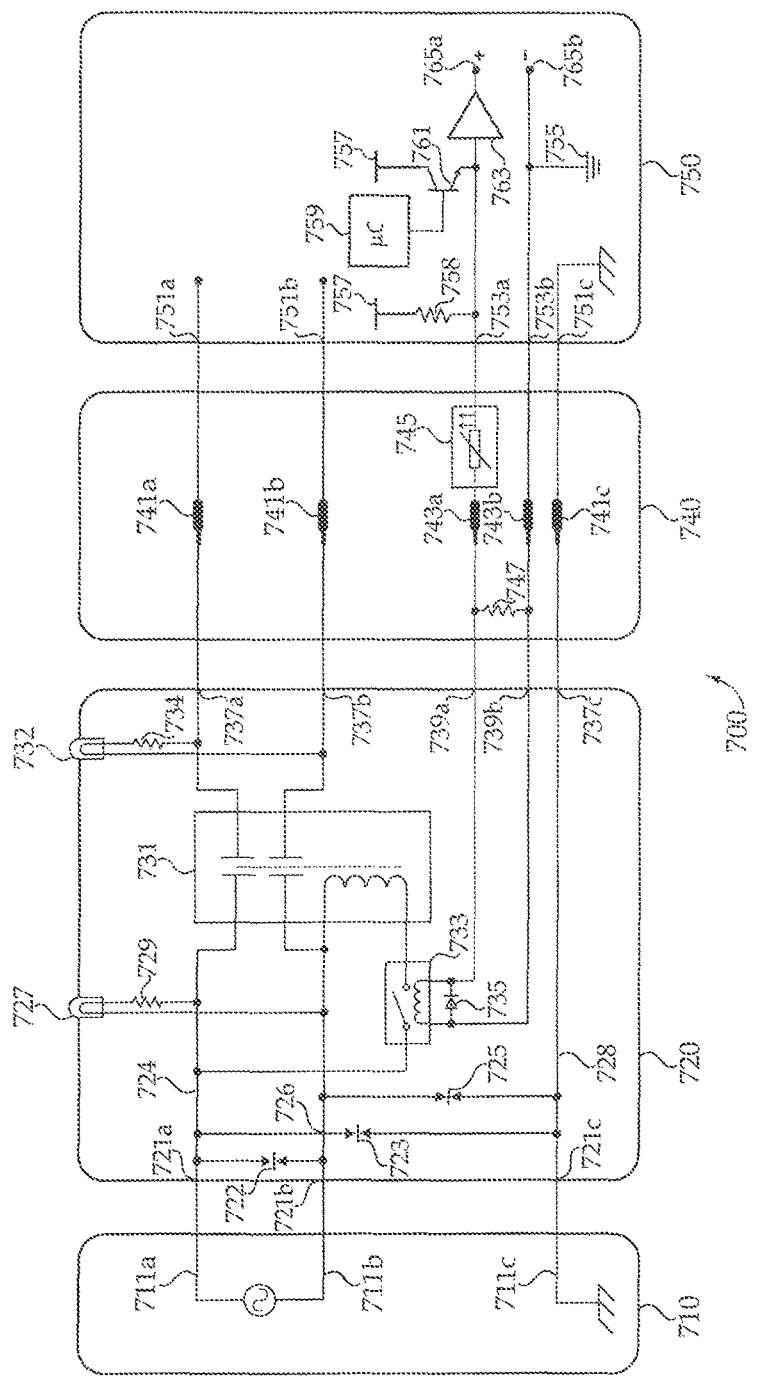

With reference to FIG. 7 there is a circuit diagram illustrating another exemplary battery charger system 700 which includes an isolation device 720, a plug 740, and an electric vehicle 750. An AC power source 710 includes a hot output terminal 711a, a neutral output terminal 711b, and a ground output terminal 711c. Isolation device 720 is coupled to power source 710. Specifically, isolation device 720 includes AC input terminals 721a, 721b, and 721c which are coupled to AC output terminals 711a-711c, respectively. Isolation device 720 also includes AC output terminal 737a coupled to input terminal 721a by way of a power distribution line 724; an AC output terminal 737b coupled to input terminal 721b by way of a power distribution line 726; and an AC output terminal 737c coupled to input terminal 721c by way of power distribution line 728. Device 720 includes a transient voltage suppression diode 722 coupled between lines 724 and 726; a transient voltage suppression diode 723 coupled between lines 724 and 728; and a transient voltage suppression diode 725 coupled between lines 726 and 728.

Isolation device 720 also includes a relay 731 coupled to lines 724 and 726. Between relay 731 and input terminals 721a-721b, an indicator LED 727 and resistor 729 are coupled between lines 724 and 726. LED 727 is structured to illuminate when isolation device 720 receives AC power from power source 710. Between relay 731 and output terminals 737a and 737b, an indicator LED 732 and a resistor 734 are coupled between lines 724 and 726. LED 732 is structured to illuminate when isolation device 720 receives power from power source 710 and relay 731 is closed.

The winding of relay 731 is coupled to line 726 and line 724 by way of a second relay 733. The winding of the relay 733 is coupled to two output terminals 739a and 739b. A diode 735 is coupled in parallel to the winding of relay 733.

Electric vehicle 750 is coupled to a plug 740. Isolation device 720 is coupled to plug 740. Specifically, plug 740 includes a plurality of electric vehicle connection points 741a-741c and 743a-743b, each connection point being coupled to isolation device 720 output terminals 737a-737c and 739a-739b, respectively. Plug 740 also includes a resistor 747 coupled between connection points 743a and 743b, as well as a thermal disconnect device 745 coupled to connection point 743a. Thermal disconnect device 745 is structured to disrupt the flow of current to the winding of the second relay 733 in response to an overheating condition in system 700. For example, device 745 may activate in response to a high impedance fault on distribution lines 751a-751c.

Electric vehicle 750 is structured to be coupled to plug 740. Specifically, vehicle 750 includes a plurality of distribution lines 751a-751c and 753a-753b, each line being coupled with electric vehicle connection points 741a-741c and 743a-743b, respectively. Vehicle 750 includes a DC power source 757 coupled to line 753a by way of a resistor 758. Power source 757 is also coupled to line 753a by way of a switching device 761. Switching device 761 is coupled to a controller 759. Lines 753a and 753b include line terminals 765a and 765b, respectively, which may be coupled to microcontroller 759. The voltage difference between 765a and 765b is denoted as Vconnect. Between switching device 761 and terminal 765a, a buffer 763 is coupled to line 753a and is structured to limit the current flowing to terminal 765a.

Electric vehicle 750 is structured to detect the connection of isolation device 720 by measuring the magnitude of Vconnect. For example, when isolation device 720 is not coupled to electric vehicle 750, DC power flows from source 757 to terminal 765a by way of resistor 758 and line 753a. A voltage sensor measures a first value of Vconnect. When isolation device 720 is coupled to electric vehicle 750, current flows from DC power source 757 to ground 755 in one path by way of resistors 758 and 747, and in a second path by way of resistor 758 and the voltage sensor coupled to terminals 765a and 765b. The voltage sensor measures a second value of Vconnect. When isolation device 720 is coupled to electric vehicle 750, the current flowing through resistor 758 to relay 733 is insufficient to actuate relay 733. In response to detecting the change in Vconnect from the first value to the second value, microcontroller 759 transmits an activation signal to switching device 761, allowing current to flow from DC power source 757 to relay 733 by way of switching device 761, actuating relay 733. The actuation of relay 733 causes relay 731 to close, allowing AC power to flow from the AC power source 710 to electric vehicle 750.

It shall be appreciated that any or all of the foregoing features of system 700 may also be present in the other battery charger systems disclosed herein.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A battery charging system comprising:
   an isolation device comprising:
      an AC input terminal structured to receive AC power;
      an AC output terminal structured to provide AC power received with the AC input terminal;
      two DC output terminals structured to transmit DC power;
      a first portion of a detection circuit including a first sensor and a first resistor coupled in series, the first resistor being coupled in parallel to the two DC output terminals; and
      a first controller in communication with the first sensor and structured to selectively isolate the AC input terminal of the isolation device from the AC output terminal of the isolation device; and
   an electric vehicle charger comprising:
      an AC input terminal structured to be coupled to the AC output terminal of the isolation device;
      two DC input terminals structured to be coupled to the two DC output terminals of the isolation device; and
      a second portion of the detection circuit including a second sensor and a second resistor coupled in series, the second resistor being coupled in parallel to the two DC input terminals,
   wherein the first controller is structured to isolate the AC input terminal of the isolation device from the AC output terminal of the isolation device when the two DC input terminals of the electric vehicle charger are not coupled to the two DC output terminals of the isolation device.

2. The system of claim 1 wherein the first portion of the detector circuit includes a DC power source having a rectifier coupled to the AC input terminal and structured to receive AC power from the AC input terminal, convert the AC power to DC, and provide the DC power to the first portion of the detection circuit.

3. The system of claim 2 wherein the first sensor is structured to measure current flowing from the DC power source to the first resistor.

4. The system of claim 3 wherein the first controller is structured to receive the current measurement from the first sensor, compare the current measurement to a first range of current magnitudes, and allow AC power to flow from the AC input terminal to the AC output terminal in response to the received current measurement being within the first range of current magnitudes.

5. The system of claim 4 wherein the first controller is structured to isolate the AC input terminal from the AC output terminal in response to the received current measurement being within a second range of current magnitudes.

6. The system of claim 5 wherein the values of the first range of current magnitudes are less than the values of the second range of the current magnitudes.

7. The system of claim 1 wherein the isolation device comprises a relay coupled between the AC input terminal and the AC output terminal and coupled to the first controller, the relay being structured receive power from the first controller, transmit power from the AC input terminal to the AC output terminal in response to receiving power from the first controller, and disrupt the flow of power from the AC input terminal to the AC output terminal in response to not receiving power from the first controller.

8. The system of claim 1 wherein the second portion of the detection circuit comprises a switching device coupled in series with the second resistor and coupled in parallel with the two DC input terminals, the switching device also being coupled to a second controller and structured to open and close the switching device in response to receiving an activation signal from the second controller.

9. The system of claim 8 wherein the second controller is structured to open the switching device in response to receiving a current measurement from the second sensor.

10. The system of claim 1 wherein the second portion of the detection circuit includes a second DC power source structured such that the voltage across the first DC power source is greater than the voltage across the second DC power source.

11. The system of claim 1 wherein the AC input terminals of the isolation device and the electric vehicle charger include a hot connection point, a neutral connection point, and a ground connection point.

12. A battery charging system comprising:
an isolation device structured to receive AC power and selectively provide AC power;
an electric vehicle battery charger coupled to a battery, the battery charger structured to be coupled to the isolation device and receive AC power from the isolation device; and
a detection circuit including a first portion having a first DC current sensor and a second portion having a second DC current sensor, the first portion and second portion being structured to be coupled together when the battery charger is coupled to the isolation device,
wherein the first portion of the detection circuit is located within the isolation device and the second portion of the detection circuit is located within an electric vehicle,
wherein the detection circuit is structured such that the second DC current sensor measures a first current value when the isolation device is not receiving AC power but the isolation device is coupled to the battery charger, and
wherein the detection circuit is structured such that the second DC current sensor measures a second current value when the isolation device is receiving AC power and the isolation device is coupled to the battery charger.

13. The system of claim 12, wherein the first portion and second portion each additionally include a DC power source, a semiconductor device, and a second resistor coupled in series with the first or second DC current sensor, the first and second portion being structured to be coupled together by coupling the resistors of each portion in parallel.

14. The system of claim 12 wherein the battery is housed in a golf cart.

15. The system of claim 12 wherein the detection circuit is structured such that the first DC current sensor measures a first current value when the isolation device is receiving AC power but is not coupled to the battery charger; the detection circuit is structured such that the first DC current sensor measures a second current value when the isolation device is receiving AC power and coupled to the battery charger; and the detection circuit is structured such that the second DC current sensor measures a third current value when the isolation device is not coupled to the battery charger.

16. The system of claim 12 wherein the isolation device includes a cable having a plug and the electric vehicle battery charger includes a plug receptacle structured to be coupled to the plug of the isolation device.

17. The system of claim 16 wherein a portion of the detection circuit is housed in the cable of the isolation device.

18. A method for charging the battery of an electric vehicle comprising:
operating an isolation device including an AC input terminal; an AC output terminal; a DC output terminal; a first detection circuit including a first DC power source, a first current sensor, a first diode, and a first resistor coupled in series; and a first controller structured to selectively couple the AC input terminal and the AC output terminal;
operating an onboard battery charger including an AC input terminal; a second detection circuit including a DC second power source, a second current sensor, a second diode, and a second resistor coupled in series; and a second controller structured to control the first controller so as to selectively isolate the AC input terminal and the AC output terminal of the isolation device;
operating the first detection circuit so as to measure the current flowing from the DC first power source to the first diode and transmitting the current measurement to the first controller;
determining with the first controller whether the isolation device is coupled to an electric vehicle charger using the current measurement from the first current sensor; and
providing AC power to the electric vehicle charger in response to determining the isolation device is coupled to an electric vehicle charger.

19. The method of claim 18 additionally comprising:
measuring the magnitude of the current flowing from the second DC power source to the second diode with the second current sensor;
in response to determining the measured current is within a first range of current magnitude values, operating the second controller so as to disable the operational controls of the electric vehicle; and in response to determining the measured current is within a second range of current magnitude values, operating the second controller so as to inactivate the onboard battery charger until the onboard battery charger receives AC power at the AC input terminal of the onboard battery charger.

20. The method of claim 18 additionally comprising:

detecting a fault within the isolation device with the first controller; and storing fault data in memory.

* * * * *